Jan. 23, 1945. W. M. McKNIGHT 2,367,882
INTERLOCKING SEALING DEVICE
Filed July 16, 1942
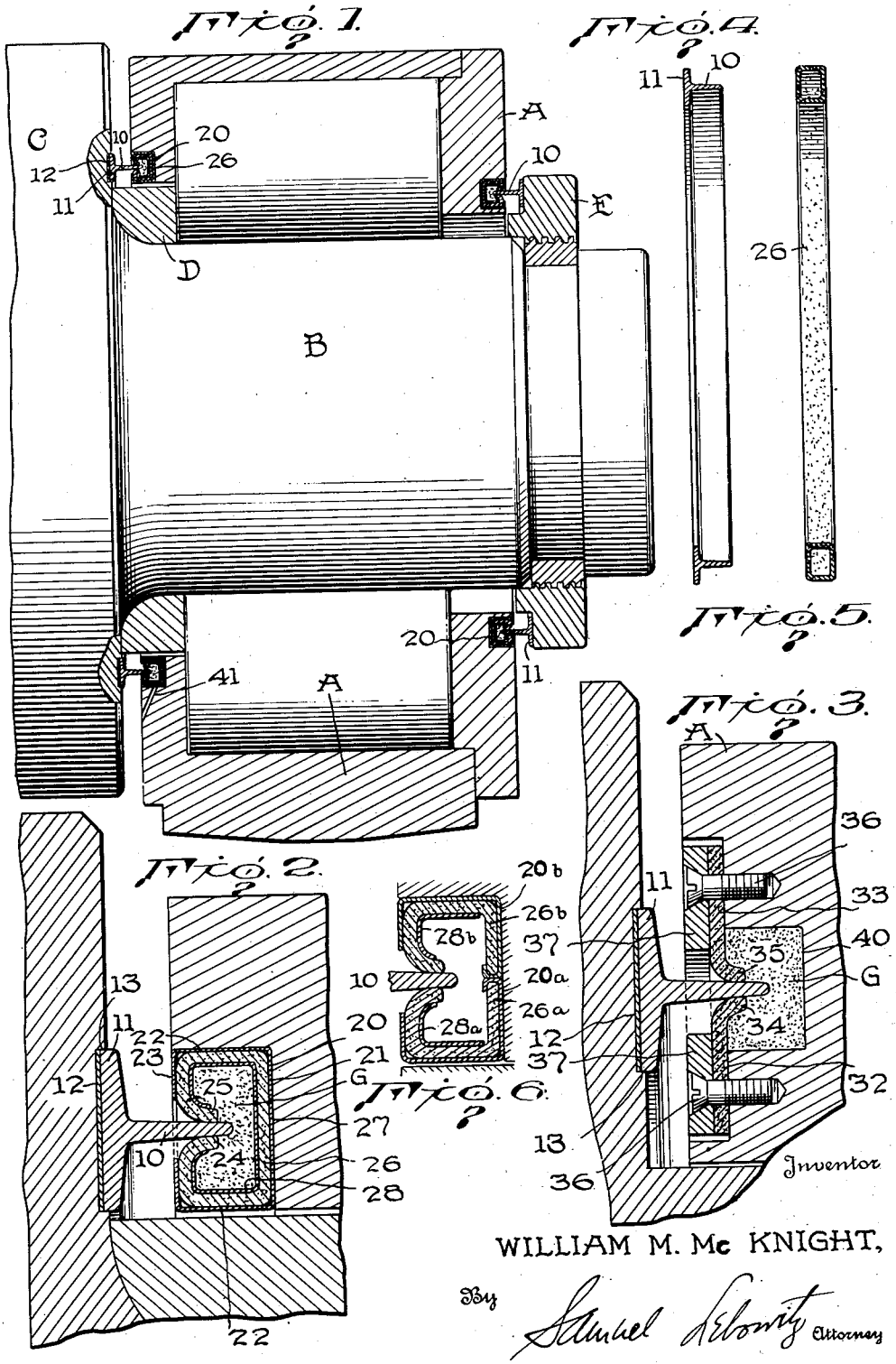
WILLIAM M. McKNIGHT,
By Samuel Lebowitz
Attorney Patented Jan. 23, 1945

2,367,882

UNITED STATES PATENT OFFICE 2,367,882

INTERLOCKING SEALING DEVICE

William M. McKnight, Butler, Pa.

Application July 16, 1942, Serial No. 451,172

9 Claims. (Cl. 286—7)

This invention relates to a sealing arrangement for a bearing for a rotary element on a fixed element and particularly to an interlocking sealing device which provides an effective seal against the entrance of foreign matter to the bearing parts.

It is the object of the present invention to provide a rugged sealing arrangement for rotary shafts, journals and the like which is effective in providing a positive seal for the bearing while permitting reasonable variations in tolerances between the parts initially as well as in the course of operation of the elements and the consequent variations due to wear as a result thereof.

It is a further object of the present invention to provide a sealing arrangement which has an interlocking effect to obtain an effective seal while attaining a double sealing effect.

It is a further object of the invention to provide a seal which may be assembled and dismantled conveniently and which maintains its effective sealing characteristics despite non-use thereof and preparatory to a repeated use thereof.

It is a further object of the invention to provide a sealing arrangement which may be affixed to new or existing structures at low cost and one which may be maintained in efficient use very easily.

It is a further object of the invention to provide a sealing arrangement which may be easily maintained in effective working order and one in which any or all of the parts may be replaced easily as they become worn.

It is a further object of the invention to provide a sealing arrangement for a bearing formed in part by a sealing fluid which may be utilized to dissipate some of the heat generated in the bearing.

The invention is realized by the provision of an annular ring upon one element of a rotating assembly, preferably the rotating member, having a projection extending therefrom concentrically and coaxially with the rotary element into interlocking engagement with a receptacle on the other element, preferably the fixed element, which is disposed oppositely to the annular projection and which is provided with flexible lips normally closing the receptacle but which are capable of distention by the protrusion of the projection into the receptacle to a point beyond the terminals of the lips, whereupon the lips are directed inwardly of the receptacle and result in a wiping action thereof against the opposite faces of the projection. A suitable sealing medium such as a hard grease or a more fluid oil is disposed in the receptacle to complete the seal formed in part by the projection and the sealing lips. Any foreign mater which may succeed in forcing itself beyond one of the annular lips is effectively trapped in the receptacle and is incapable of passage past the other lip to cause damage to the bearing surfaces within the space defined by the sealing arrangement. Suitable drains may be provided leading from the receptacle housing for leading away any moisture trapped therein. The receptacle housing and the oil contained therein may be connected to a circulating system to exercise a cooling action upon the bearing.

Other objects and purposes will appear from a detailed description of the invention following hereinafter, taken in conjunction with the accompanying drawing, wherein Fig. 1 is a vertical sectional view of a sealing arrangement for a rolling mill bearing in accordance with the present invention;

Fig. 2 is an enlarged detailed view of the sealing arrangement shown in the upper left hand portion of Fig. 1;

Fig. 3 is a vertical sectional view of a modified arrangement from that shown in Fig. 2;

Fig. 4 is a vertical sectional view of the annulus or ring-like member constituting the male element of the sealing arrangement;

Fig. 5 is a corresponding sectional view of part of the annulus or ring-like member constituting the female element of the sealing arrangement; and Fig. 6 is a vertical sectional view of a modification of the sealing arrangement shown in Fig. 2.

In Fig. 1 is shown a sealing arrangement in accordance with the present invention applied to a rolling mill bearing construction, in which application an effective seal against the entry of foreign matter such as water, scale and the like, resulting from the rolling operations, is desired.

The bearing elements of this assembly or analogous assembly may be conventional and the arrangement is illustrated as consisting of a bearing block A constituting a fixed element of the assembly adapted to receive the journal B of the roll C. A collar D is provided at one end of the journal and a terminal ring E is provided at the opposite end of the journal.

The invention has for its objective the prevention of the entry of any foreign material such as water or scale to the bearing structure of the journal B rotating in the block A. To attain this objective, an annular ring formed by base flanges 11 and substantially rigid projection 10 extending therefrom is mounted on the lateral wall of the rotary member concentric with the rotary axis of the roll and so disposed that the projection 10 extends in substantial parallelism to the rotary axis of the assembly. The end wall of the roll may be recessed at 13 to receive a gasket seat 12 upon which is applied the annular flange 11 and which is fixed onto the roll by any suitable means such as threaded bolts. The mounting may be directly upon the end wall of the roll end in no recess therein, and may be of any desired diameter to space the same from the journal.

A receptacle for the projection 10 is formed in the bearing block A and may be formed by a circular housing 20 which is adapted to be seated in an annular channel 27 in the body of the bearing block. This housing 20 may be formed of sheet metal which is pressed into a substantially rectangular configuration consisting of a circular base wall 21 merging into two opposed walls 22 and terminating in annular flanges 23 substantially parallel to the base 21. A flexible sheet-like liner 26 of leather or other suitable material is disposed on the inside of the walls 21 and 22 and the flange 23 terminating in circular extremities 24 and 25 which may abut against each other to seal the interior of the housing against foreign matter at those times when the sealing arrangement is not in use. In the operative condition of the sealing arrangement, the projection 10 protrudes into the receptacle housing forcing extremities 24 and 25 inwardly, as shown in the drawing, to provide a wiping contact for the extremities 24 and 25 against the opposite faces of the projection 10. This wiping contact of the flexible material may be supplemented by the provision of a spring material such as spring steel 28 which may be continuous or of cage form which backs the flexible liner 26 and which enhances the pressing action of the lips 24 and 25 against the opposite faces of the projection 10. The interior of the housing may be filled with a suitable sealing medium such as hard grease G which acts as a solid and liquid seal against the passage or entry of foreign matter which falls thereagainst from the roll C and from between the roll and the bearing block onto the projection 10. Any moisture which may force itself into the receptacle housing past the lip 25 is entrapped within the housing since it is difficult for the same to pass the lip 24 on account of the concave curvature thereof, and the same may be passed off by the provision of one or more drain passages 41 leading from the housing after the moisture seeps down through the sealing medium of hard grease or the like to the lowermost part of the housing. Thus, the travel of foreign matter past both lips 25 and 24 to the bearing structure at the collar D and journal B within the block A is effectively excluded.

A similar structure consisting of a ring-like male member 10 may be provided on the clamping ring E to cooperate with a female housing 20 disposed on the opposite side of the bearing block, as shown in Fig. 1.

A simplified embodiment of the invention is illustrated in Fig. 3 of the drawing and shows a receptacle formed by an annular channel 40 recessed directly into the body of the bearing block A. The recess is filled with a sealing medium G and is covered with rings of flexible material 32 and 33 normally contacting each other midway of the opening of the recess to protect the sealing medium against dirt and foreign matter when the sealing arrangement is not operative. The introduction of the projection 10 into the recess 40 causes the ends of the rings 32 and 33 to assume a re-entrant configuration facing inwardly the interior of the recess. The flexible rings 32 and 33 may be clamped in place onto the bearing block by means of concentric rings 37 held in place by bolts 36 disposed circumferentially around these rings. If desired, spring backing plates may be disposed between the flexible rings 32 and 33 and the body of the bearing block to supplement the resilient action of the inner circumferential edges of the rings at the lips 34 and 35.

The construction shown in Fig. 3 permits a convenient substitution of the parts of the assembly should some of these parts wear more readily than others. Thus, either the rings 32 or 33 may be replaced as soon as the respective one is worn, without necessitating the replacement of the other until the wear thereof requires it. This advantage may be realized with the construction shown in Fig. 2 by the provision of a split housing as shown in Fig. 6. In this case, the housing is formed of two symmetrically arranged sections 20a and 20b retaining respectively the flexible liners 26a and 26b which may be backed by resilient members 28a and 28b respectively. This construction permits the alternative replacement of either half of the housing with its cooperative elements if only one of the sections should require replacement for effective operation.

If the space in the receptacle be filled with a fluid medium such as a heavy oil, and should the same be connected to a circulating pump, the arrangement makes possible the dissipation of heat engendered in the bearing by recirculating the sealing liquid between the receptacle and a suitable point of heat exchange where the same may be cooled.

It is evident that with all constructions described above, the alignment between the elements of the sealing device is attained automatically as long as both are of the same desired diameter. No further effort is required to complete the interlocking closure of the device with its double sealing effect. Excessive filler parts in the rotating assembly are not necessary. Furthermore, the seal is self-conditioning for should it be necessary to dismantle the parts of the seal, such can be executed quickly and expeditiously, with no injury to the seal for further use or application.

While I have described my invention as embodied in specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. A seal for a bearing for a rotary element mounted within a fixed element to exclude foreign matter from said bearing comprising a substantially rigid annular projection on said rotary element concentric with the rotary axis thereof and extending in substantial parallelism thereto, and an annular receptacle on said fixed element in substantial alignment with said annular projection for receiving said projection and provided with annular resilient lips of sheet material adapted to be distorted into re-entrant formation for contacting the opposite faces of said projection, said resilient lips normally adapted to rest in a common plane and to substantially close said annular receptacle.

2. A seal for a bearing for a rotary element mounted within a fixed element to exclude foreign matter from said bearing, comprising a substantially rigid ring-like male member on one of said elements and a correspondingly ring-like female member on the other of said elements, said male member adapted to extend in a direction substantially parallel to the rotary axis of said rotary element and to protrude into said female member, and ring-like sealing lips of sheet material across the opening of said female member adapted to make resilient wiping contact with the opposite sides of the portion of said male member which extends into said female member as said sheet material is flexed inwardly in said female member by said male member.

3. A seal for a bearing for a rotary element mounted within a fixed element to exclude foreign matter from said bearing comprising a substantially rigid ring-like male member on said rotary element and a correspondingly ring-like female member on said fixed element, said male member adapted to extend in a direction substantially parallel to the rotary axis of said rotary element and to protrude into said female member, ring-like sealing lips normally disposed in a common plane across the opening of said female member and adapted to be flexed inwardly thereof to make resilient wiping contact with the opposite sides of the portion of said male member which extends into said female member, and a plastic sealing medium within said female member.

4. A seal for a roll neck bearing on a bearing block to exclude foreign matter from said bearing, said seal comprising an annular receptacle in the bearing block, an annular projection opposite said receptacle extending from a lateral wall of the rotating roll body into said receptacle, and circular resilient lips of sheet material across the open end of said receptacle contacting the opposite faces of said annular projection, said resilient lips being formed by a single piece of flexible material lining the receptacle with a backing liner of resilient metallic material.

5. A seal for a roll neck bearing on a bearing block to exclude foreign matter from said bearing, said seal comprising an annular receptacle in the bearing block, an annular projection opposite said receptacle extending from a lateral wall of the rotating roll body into said receptacle, and a pair of concentric rings of resilient sheet material overlying the annular receptacle and forming a distendable circular slot thereover through which said projection extends into said receptacle, the adjacent free ends of said rings at said slot being flexed inwardly of said receptacle into wiping contact with the opposite faces of said projection.

6. A seal for a roll neck bearing on a rolling mill bearing block to exclude foreign matter from said bearing, said seal comprising an annular receptacle disposed on the bearing block, a substantially rigid annular projection opposite said receptacle extending from the end wall of the roll into said receptacle, circular resilient lips of flexible material normally disposed in a common plane across the open end of said receptacle and adapted to contact the opposite faces of said annular projection in the flexed position of said lips inwardly of said receptacle, and a mass of lubricating material in said receptacle.

7. A seal for a roll neck bearing on a rolling mill bearing block to exclude foreign matter from said bearing, said seal comprising an annular receptacle disposed on the bearing block, a substantially rigid annular projection opposite said receptacle extending from the end wall of the roll into said receptacle, circular resilient lips of flexible sheet material normally disposed in a common plane across the open end of said receptacle and adapted to contact the opposite faces of said annular projection in the flexed position of said lips inwardly of said receptacle, a mass of lubricating material in said receptacle, and a drain passage in said bearing block leading from said receptacle for guiding away any liquid entrapped therein.

8. A seal for a roll neck bearing on a rolling mill bearing block to exclude foreign matter from said bearing, said seal comprising an annular receptacle in the bearing block, a housing within said receptacle having a flexible liner of sheet material terminating in juxtaposed circumferential lips disposed in a common plane, a substantially rigid annular projection opposite said receptacle extending from a lateral wall of the rotating roll body into said receptacle, said lips being arranged across the open end of said housing and adapted to contact the opposite faces of said annular projection when said projection is inserted into said receptacle and said lips are flexed inwardly thereof.

9. The combination set forth in claim 8 wherein said housing is formed of a pair of concentrically arranged and individually removable sections, each of said sections having a flexible liner terminating in a circumferential lip in juxtaposed relation to the lip of the other section.

WILLIAM M. McKNIGHT.